Figure 2:
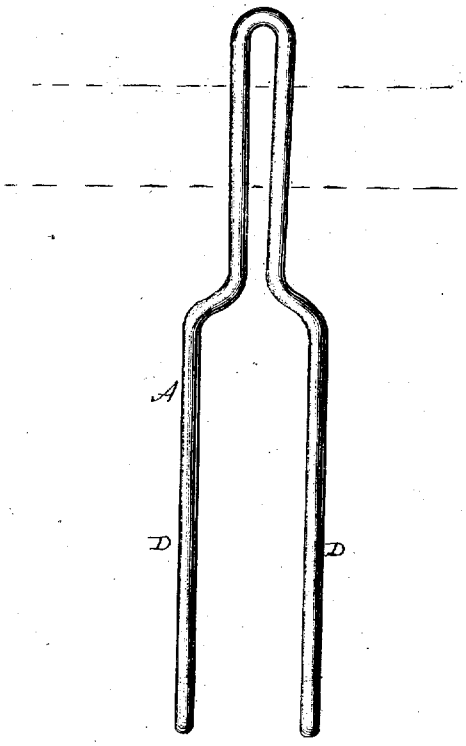

E. C. PATTERSON.

REIN HOLDER FOR CARRIAGES.

No. 4,133. Reissued Sept. 27, 1870.

Elias C. Patterson
By his Atty J. Dennis Jr

Witnesses
Chas. Hardaway
Bernard Kleiner

N. PETERS, Photo-Lithographer, Washington, D. C.

United States Patent Office.

ELIAS C. PATTERSON, OF ROCHESTER, NEW YORK.

Letters Patent No. 62,879, dated March 12, 1867; reissue No. 4,133, dated September 27, 1870.

IMPROVEMENT IN REIN-HOLDERS FOR CARRIAGES.

The Schedule referred to in these Letters Patent and making part of the same

*To all whom it may concern:*

Be it known that I, ELIAS C. PATTERSON, of the city of Rochester, in the county of Monroe and State of New York, have invented a certain new and useful Improvement in Rein-holders for Carriages, &c., of which the following is a specification.

*Nature of the Invention.*

This invention consists of a rein-holder made of spring wire, so arranged as to present two upright arms for holding the reins, and capable of being attached to any portion of the dash-board, as hereinafter described.

*General Description.*

In the drawing—

Figure 1:
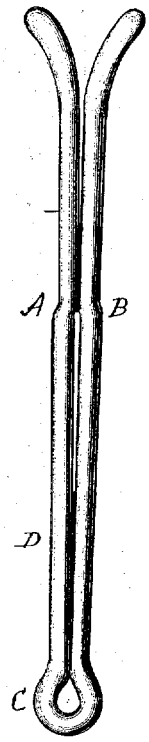

Figure 1 is a front elevation, and

Figure 2, a side elevation.

A is one side of the rein-holder, and

B, the other side, being of such height as to properly receive the reins between, and hold them by the natural inherent elasticity of the wires themselves. The tops are preferably separated and made to stand outward, as shown, in order to allow the easy insertion of the reins.

One convenient way of forming the rein-holder is as follows:

Take a piece of elastic or spring-metal wire, about one foot in length, and double it together, so as to form an eye, C, for a small bolt. Then bend each part into the form shown in fig. 2, and form an eye for a bolt between the two ends, opposite the eye C, and bend the upper ends, or spread them apart, as shown in fig. 1, to facilitate inserting the reins.

After the wire is bent, as above stated, solder the wires together for about one inch above the eye C, the elasticity of the wire above the soldering being sufficient to hold and gripe the reins when in place. The most convenient place for the rein-holder is on the dasher of the carriage, sleigh, or other vehicle; and the prongs D D may be put astride the edge of the dasher, and a bolt put through the eyes C. to hold it on firmly for use.

The rein-holder is shown in the drawing as being made of round wire; but it may be made of oval, square, flat, or other shaped wire, and in such form as may be preferred, and arranged to gripe the reins by springing together. The method by which it is fastened to the dasher or other part of the carriage may be varied in form, as found most convenient.

I disclaim the broad principle of jaws shutting together to hold the reins, as such is shown in the patent of T. L. Tripp, September 5, 1865. In that case, however, the jaws are made of stiff or rigid blocks, and forced together by independent springs placed under them. Such is not the equivalent of my invention.

*Claim.*

What I claim, and desire to secure by Letters Patent, is—

A rein-holder, constructed of spring wire, having elastic jaws A B, for clasping the reins between them, and capable of attachment to the dasher in any suitable manner, substantially as specified.

In witness whereof, I have hereunto signed my name in the presence of two subscribing witnesses.

E. C. PATTERSON.

Witnesses:

R. F. OSGOOD,

G. WILLM. MIATT.